United States Patent [19]

Mase et al.

[11] Patent Number: 5,109,306

[45] Date of Patent: Apr. 28, 1992

[54] TRACK ACCESS CONTROL SYSTEM FOR MAGNETIC DISK SYSTEM WITH PERIODIC TRACK OFFSET UPDATE

[75] Inventors: Hiroyuki Mase, Kawasaki; Takeo Masuda, Yokohama, both of Japan

[73] Assignee: Fujitsu Limited, Kanagawa, Japan

[21] Appl. No.: 742,191

[22] Filed: Aug. 2, 1991

Related U.S. Application Data

[63] Continuation of Ser. No. 632,615, Dec. 26, 1990, abandoned, which is a continuation of Ser. No. 442,463, Jan. 30, 1989, abandoned, which is a continuation of Ser. No. 27,381, Mar. 18, 1987, abandoned.

[30] Foreign Application Priority Data

Mar. 19, 1986 [JP] Japan .................. 61-061163
Mar. 19, 1986 [JP] Japan .................. 61-061164

[51] Int. Cl.$^5$ .............................. G11B 5/596
[52] U.S. Cl. ....................... 360/77.04; 360/77.07
[58] Field of Search ............. 318/634; 360/49, 77.02, 360/77.03, 77.04, 77.07

[56] References Cited

U.S. PATENT DOCUMENTS

| | | | |
|---|---|---|---|
| 3,546,686 | 12/1970 | McPherson et al. | 360/49 |
| 3,701,130 | 10/1972 | Ault | 360/49 |
| 4,121,265 | 10/1978 | Derc | 318/634 |
| 4,136,365 | 1/1979 | Chick et al. | 360/78 |
| 4,157,577 | 6/1979 | Porter, Jr. et al. | 360/78 |
| 4,396,959 | 8/1983 | Harrison et al. | 360/78 |
| 4,434,487 | 2/1984 | Rubinson et al. | 360/53 |
| 4,536,809 | 8/1985 | Sidman | 360/77.04 |
| 4,746,998 | 5/1988 | Robinson et al. | 360/49 |
| 4,797,755 | 1/1989 | Baldwin et al. | 360/49 |

FOREIGN PATENT DOCUMENTS 0163481 12/1985 European Pat. Off. ............. 360/49
52-30408 3/1977 Japan.

OTHER PUBLICATIONS

IBM Tech. Disc. Bul., "Generation of Position Correction Signal for All Disk Pack Surfaces", G. R. Santana, vol. 12, No. 11, Apr. 1970, p. 1891.

IBM Tech. Disc. Bul., "correction of Data Track Misregistration in Servo Controlled Disk Files", A. Paton, vol. 17, No. 6, No. 1974, pp. 1781-1783.

Primary Examiner—Aristotelis Psitos
Assistant Examiner—David L. Robertson
Attorney, Agent, or Firm—Armstrong, Nikaido, Marmelstein, Kubovcik & Murray

[57] ABSTRACT

A track access control system for a magnetic disc system including a magnetic disc having a plurality of servo tracks in a plurality of track zones divided in a radial direction, a logical to physical track address translation unit, a track offset update unit, and a control unit, to access a magnetic head at a physical track with offset correction. The track offset update may be carried out in an initial condition, or when a seek command is received. Also, the track offset update may be compulsorily effected when the update is not effected in a predetermined time. In this case, the system may output a virtual error data. In addition, the track offset update may be effected in response to a temperature change of the system.

15 Claims, 18 Drawing Sheets

Fig. 4a HOLE
Fig. 4b SERVO-TRACK
Fig. 4c
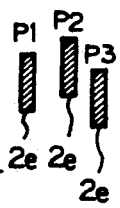
Fig. 4d SOURCE SIG
Fig. 4e PEAK VALUE
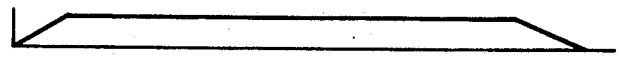
Fig. 4f SOURCE SIG
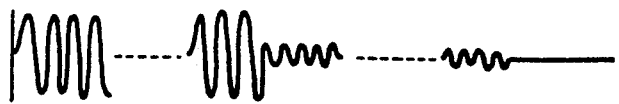
Fig. 4g PEAK VALUE
Fig. 4h SOURCE SIG
Fig. 4i PEAK VALUE
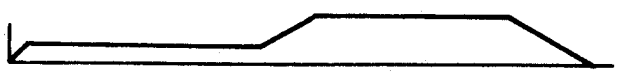

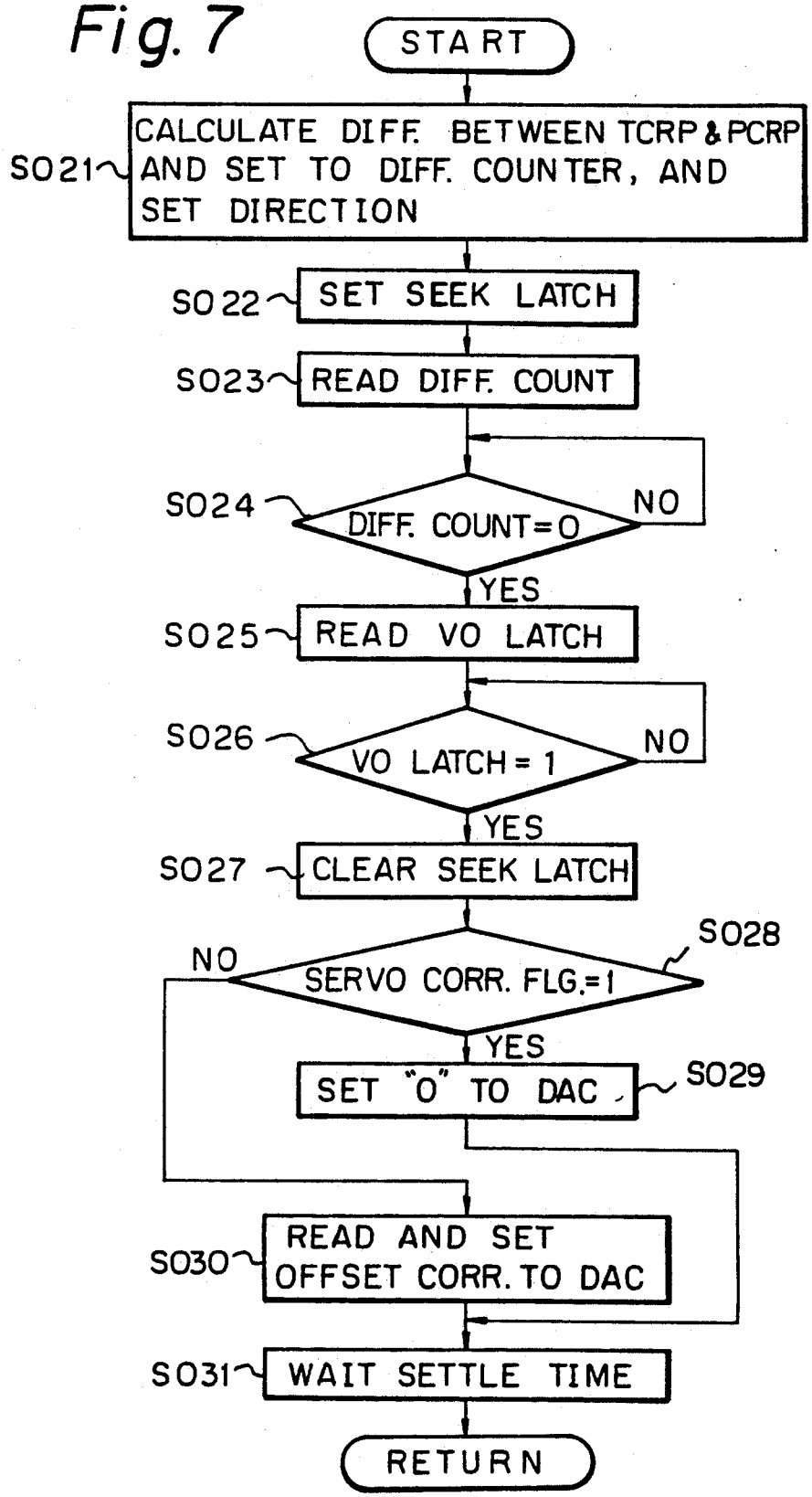

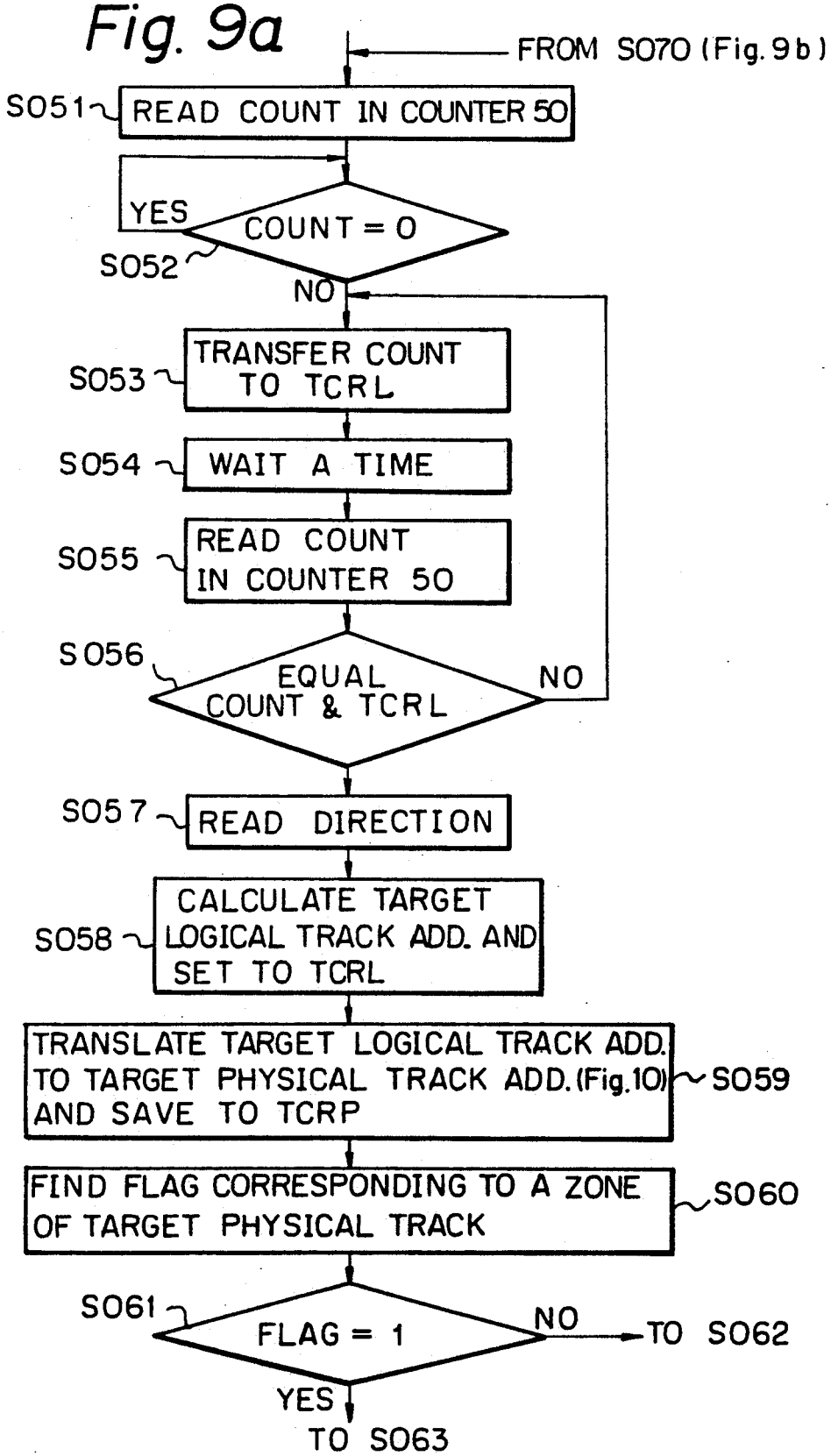

Fig.15a  R/D COMMAND
Fig.15b  OFFSET MEANS.
Fig.15c  TIMER 55a
Fig.15d  OFFSET (ZONE 1)
Fig.15e  OFFSET (ZONE 2)
Fig.15f  OFFSET (ZONE 3)
Fig.15g  OFFSET (ZONE 4)
Fig.15h  RD PULSE OUTPUT

TRACK ACCESS CONTROL SYSTEM FOR MAGNETIC DISK SYSTEM WITH PERIODIC TRACK OFFSET UPDATE

This application is a continuation of application Ser. No. 632,615 filed Dec. 26, 1990, now abandoned, which is a continuation of application Ser. No. 442,463 filed Nov. 30, 1989, which is a continuation of application Ser. No. 027,381, filed on Mar. 18, 1987 now abandoned.

BACKGROUND OF THE INVENTION

1. Field of the Invention

The present invention relates to a magnetic disc system. More particularly, it relates to a track access control system for a magnetic disc system which uses an offset obtained from servo-tracks provided in a magnetic disc, in addition to data tracks, as a correction value of a track access, and enables a host computer to access data on physical tracks in the magnetic disc by using logical tracks.

2. Description of the Related Arts

Recently, in rotation type magnetic disc systems, a distance between tracks on a magnetic disc has become short due to requirements for a high density and a large capacity of data storage. In those magnetic disc systems, the displacement of the tracks, i.e., an offset, caused by an error in magnetic head installation, temperature changes, etc., cannot be neglected, and a correction of this displacement is necessary for data access.

Accordingly, magnetic disc systems in which servo tracks storing servo positioning information are provided are known. In those magnetic systems, the magnetic head is positioned at the servo track to read the servo positioning information, a displacement of the servo track is detected, and the detected displacement is used as an offset value for correcting the displacement and positioning the magnetic head at the subsequent head accessing when access to a data track is required.

In a magnetic disc system, two types of track address, i.e., a physical track address and a logical track address, are defined. The physical track address designates actual tracks comprised by data tracks and servo tracks on the magnetic disc, but the logical track address designates only data tracks. A plurality of magnetic discs may be provided in the magnetic disc system, but in order to save effort storing servo information into all magnetic discs, the servo tracks may be partially formed on at least one face of a magnetic disc. Accordingly, the face of the magnetic disc in question is provided with the servo tracks and the data tracks. In this system, the physical track addresses designating the servo track addresses and the data track addresses differ from the logical track addresses. Another face of the magnetic disc and the other magnetic discs are provided with only data tracks.

In this case, the physical track addresses coincide with the logical track addresses.

As described above, handling of the track address is relatively difficult, and when the handling is to be processed by a host computer, the programming of the host computer is complex (JPP49-117007).

Another prior art magnetic disc system disclosed in U.S. Pat. No. 4,396,959 also suffers from the following disadvantages:

a) since two or more servo sectors cannot be provided in each track, i.e., only one servo sector is provided in each track, if a defect occurs in the servo sector, the offset measurement therefor cannot be effected, and b) due to the provision of the servo sector in each track a rotation speed of the disc must be reduced and, the density of the memory storage in a circumferential direction must be increased.

SUMMARY OF THE INVENTION

An object of the present invention is to provide an improved track access control system for a magnetic disc system with an offset correction.

According to the present invention, there is provided a track access control system for a magnetic disc system, including: a magnetic disc unit including at least one magnetic disc, at least one face of which is provided with a plurality of servo tracks and a plurality of data tracks in a radial direction. Each servo track has a plurality of servo information storing portions along the circumference of a circle. At least one magnetic head accesses the tracks on the face of the magnetic disc. A unit is provided for moving the magnetic head in the radial direction. Another unit is operatively connected to the magnetic disc unit, for rotating the magnetic disc unit. A third unit is operatively connected to the rotation unit, for generating a timing signal corresponding to the rotation of the servo information storing portions. A fourth unit is operatively connected to the magnetic head, for reading servo information from the servo information storing portions from the magnetic head, and generating servo data in response to the timing signal of the timing signal generation unit. A fifth unit is operatively connected to the servo data generation unit for measuring and updating a track offset from the servo data for the plurality of servo tracks. A sixth unit receives a logical track address and translating that address into a physical track address on the basis of the track structure of a magnetic disc to be accessed. A seventh unit is operatively connected to the track offset update unit and the track address translation unit for controlling the magnetic head through the magnetic head moving unit, by using the measured track offset corresponding to a translated physical track to be moved thereat, to position the magnetic head at the translated physical track.

The plurality of servo tracks may be provided in each of the track zones equally divided into physical tracks in the radial direction. Each servo track in each track zone may be provided at approximately center of each zone.

The track offset update unit may update all track offsets for all track zones in an initial condition. The track offset update unit may update a track offset which is not updated in a predetermined time. Also, the track offset update unit may update a track offset in response to the reception of a seek command for moving the magnetic disc to a different track zone when the different track zone is not offset-updated in the predetermined time. In addition, the update offset unit may be compulsorily energized when at least one track zone is not offset-updated in the predetermined time. The control unit may output an error data for an access command when the track offset update unit is compulsorily energized, and the control unit may output normal data when the track offset update unit terminates the offset update.

The track offset update unit may be compulsorily energized in response to a predetermined temperature change of at least the magnetic disc during the temperature transient state. The track offset update unit may be also compulsorily energized in another predetermined time defined by a constant temperature change for the temperature transient state.

BRIEF DESCRIPTION OF THE DRAWINGS

Other objects and features of the present invention will be described with reference to the accompanying drawings, in which:

FIGS. 4a to 4i are graphs representing servo information and an offset value of the magnetic disc in FIGS. 2 and 3;

FIG. 7 is a flow chart of the seek operation of the magnetic disc system in FIG. 5;

FIGS. 9a and 9b are flow charts of the access operation of the magnetic disc system in FIG. 5;

DESCRIPTION OF THE PREFERRED EMBODIMENTS

Figure 1:
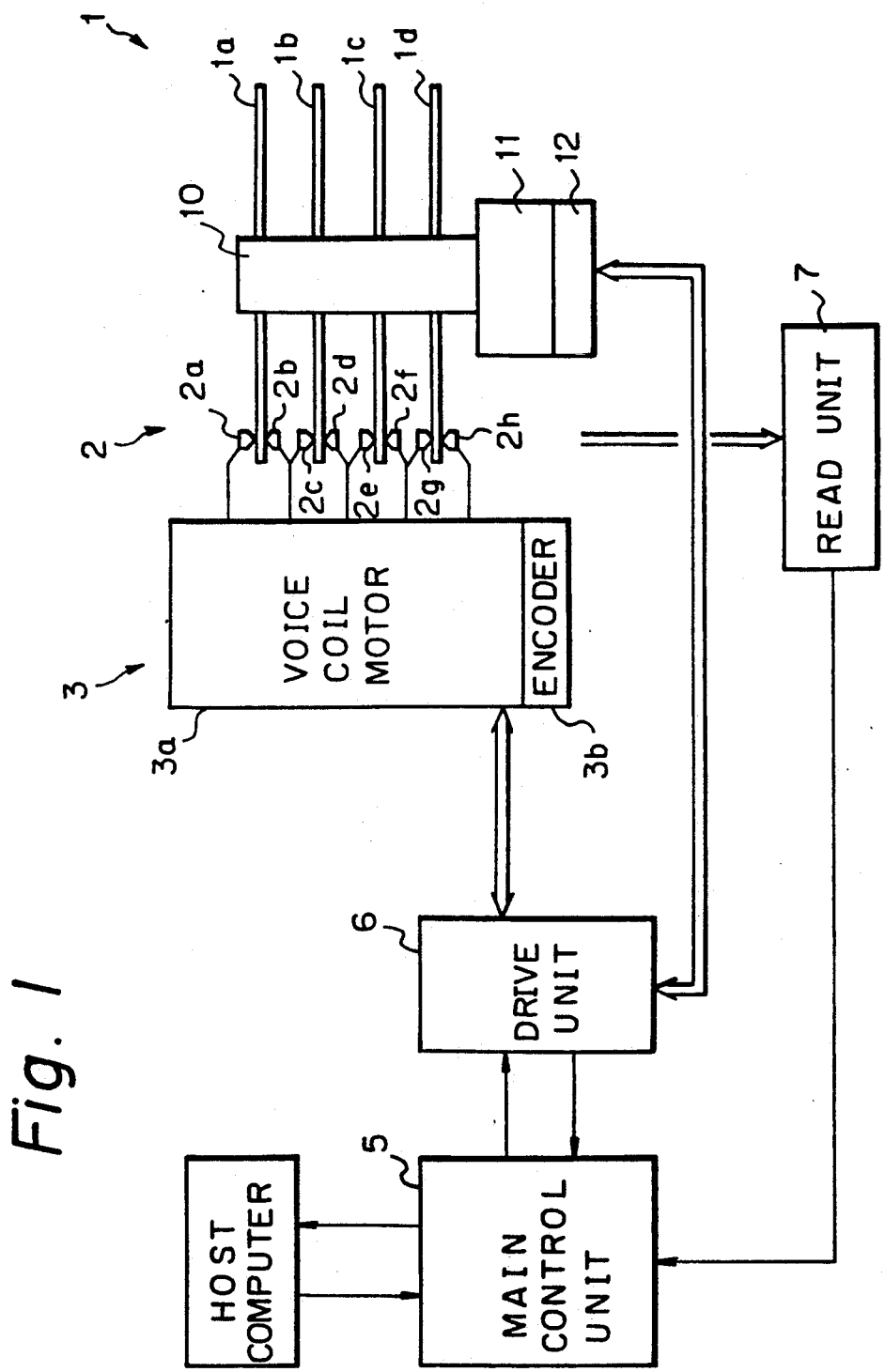
FIG. 1 is a diagram of an embodiment of a magnetic disc system according to the present invention.

A magnetic disc system in FIG. 1 includes a magnetic disc unit 1 consisting of a plurality of magnetic discs 1a to 1d each mounted on a rotary shaft 10, a magnetic head unit 2 consisting of a plurality of magnetic heads 2a to 2h, a moving unit 3 consisting of a voice coil motor 3a and an encoder 3b, a spindle motor 11 mechanically connected to and rotating the rotary shaft 10, and a servo position detection mechanism 12. The magnetic disc system further includes a control means 4 having a main control unit 5, a drive unit 6, and a read unit 7. A host computer is connected to the main control unit 5.

Figure 2:
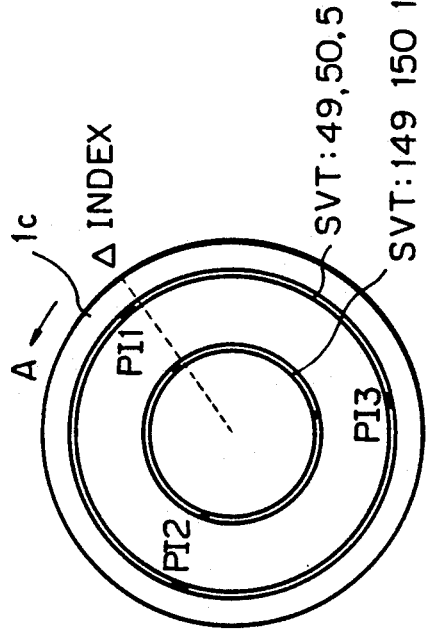
FIG. 2 is a plan view of a magnetic disc in FIG. 1 provided with servo tracks in addition to data tracks.
Figure 3:
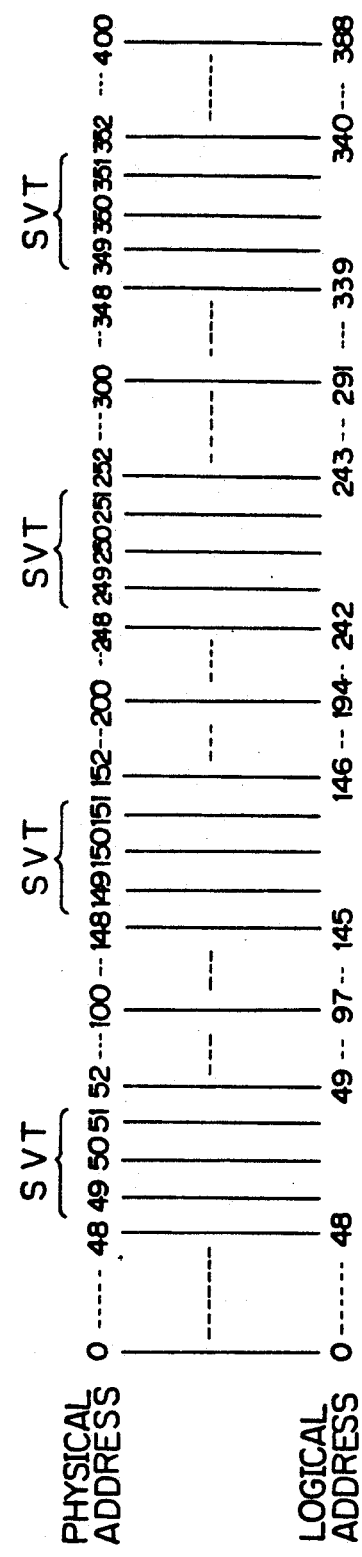
FIG. 3 is a view representing the relationship of the servo tracks, and the data tracks on the magnetic disc in FIG. 2.

Each magnetic disc is coated with a magnetic recording medium on both faces thereof. As shown in FIG. 2, an upper face of the magnetic disc 1c, which is positioned approximately at the middle of the magnetic discs in a vertical direction, is provided with servo tracks SVT and data tracks which are defined as other tracks of the servo tracks SVT, along a radial direction. A lower face of the magnetic disc 1c and both faces of the magnetic discs 1a, 1b, and 1d are provided with data tracks, but are not provided with servo tracks. FIG. 3 is a conceptual view of the upper face of the magnetic disc 1c. On the upper face, 400 physical addresses are defined, corresponding to 400 actual tracks including servo tracks 49, 50, 51; 149, 150, 151; 249, 250, 251; and 349, 350 and 351. On the other hand, 388 logical addresses which do not include the servo tracks are also defined. Tracks of physical addresses 0 to 48, 52 to 148, 152 to 248, 252 to 348, and 352 to 400 are data tracks. In this embodiment, 100 actual tracks form one zone, and at a middle portion of each zone, a servo track SVT consisting of three tracks is provided.

The other magnetic discs are provided with only data tracks, but the data tracks corresponding to the servo tracks cannot be used as data tracks.

The servo position detection mechanism 12 directly connected to the spindle motor 11 generates a "HOLE" signal corresponding to a position storing position information of the servo track SVT. The magnetic heads 2a to 2h read from or write to the magnetic discs 1a to 1d, and the voice coil motor 3a supports the magnetic heads 2a to 2h through plate-springs and moves the heads 2a to 2h in a radial direction of the magnetic discs to enable these heads to access a desired track.

As shown in FIGS. 2 and 4, each servo track, for example, the servo tracks 49, 50, and 51 includes three portions storing position information PI1 to PI3 along the track thereof at a predetermined angle, in this example 120° C., in a circle. Reference "INDEX" denotes an origin of the rotation of the magnetic disc. The servo position detection mechanism 12 generates the hole signals at the position information storing portions in response to the rotation of the spindle motor 11, as shown in FIG. 4a. Since there are three position information storing portions, at least one hole signal can be obtained even if a defects occur at two of the position information storing portions.

Each position information storing portion includes an area A and another area B, wherein position information is stored as shown by shaded lines in FIG. 4c. When the magnetic head 2e is positioned at a portion P1 denoting the center of the servo track SVT, an output from the magnetic head 2e through an amplifier is represented by a waveform as shown in FIG. 4d, and corresponding outputs of peaks are shown in FIG. 4e. The peak held outputs at the zones A and B are identical. As a result, an offset or a track offset, which is the difference between the peak held outputs at the zones A and B, is zero. When the magnetic head 2e is positioned at a portion P2 slightly shifted toward the track 49, as shown in FIG. 4c, the output of the magnetic head 2e is represented by a waveform as shown in FIG. 4f. An amplitude of the waveform where the magnetic head 2e passes the area A is large, because the magnetic head 2e faces a large shaded portion in FIG. 4c. An amplitude of the waveform where the magnetic head 2e passes the area B is small. The peak values are shown in FIG. 4g. Accordingly, a positive offset (a peak value at the area A)—(a peak value at the area B) is obtained. On the other hand, when the magnetic head 2e is positioned at a portion P3, a waveform of the output of the magnetic head 2e and peak values thereof are as shown in FIGS. 4h and 4i, and a negative offset is obtained. Note, an absolute value of the offset increases due to the amount of the displacement of the magnetic head 2e with respect to a data center on the center track 50, shown in FIG. 4c. In the adjustment, a center of the magnetic head 2e is positioned at the data center.

The offset calculation is performed when the hole signals as shown in FIG. 4a are generated.

A specific circuit construction of the main control unit 5, the drive unit 6, and the read unit 7 will be described with reference to FIG. 5.

Figure 5A:
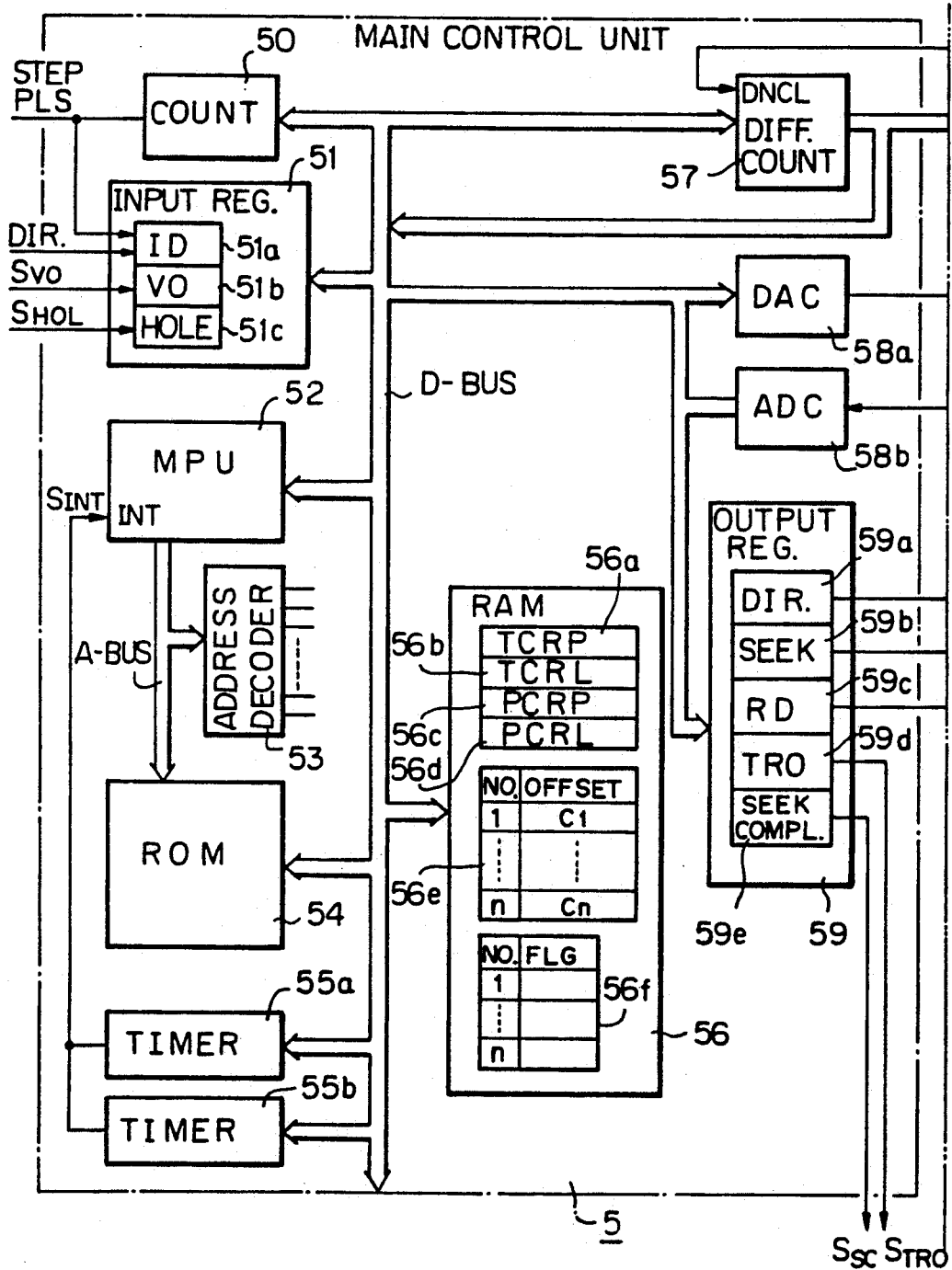
FIGS. 5a–5b are a circuit diagram of the magnetic disc system in FIG. 1.
Figure 5B:
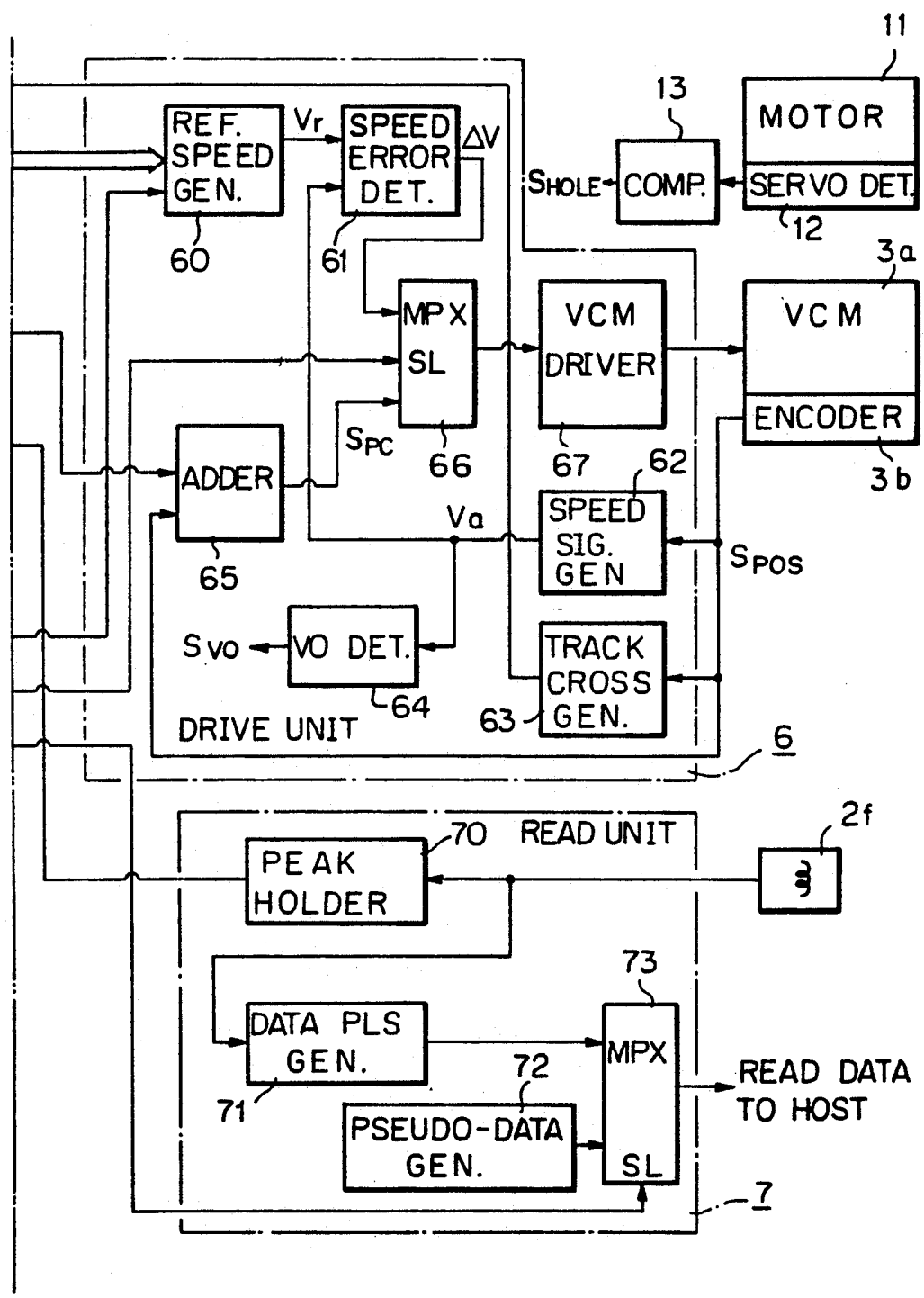

In FIG. 5, the encoder 3b generates a position signal $S_{POS}$ consisting of two phase sine waveforms, one of which has a phase lead of, for example, 90°, to the other, to discriminate the direction, in response to a motion of the magnetic head unit 2 by the voice coil motor 3a. A comparator 13 receives the position output from the servo position detection mechanism 12, changes the position output to a pulse signal, and outputs the signal as the hole signal $S_{HOLE}$.

The main control unit 5 includes a step pulse counter 50 which receives a step pulse signal having pulses corresponding to a logical address, as a "SEEK" command, from a disc controller in the host computer, and counts the received pulses. The main control unit 5 also includes an input register 51 having an identification (ID) latch 51a, a zero velocity (speed) (VO) latch 51b, and a hole latch (HOLE) 51c. The ID latch 51a receives and holds a direction signal DIR from the disc controller; the VO latch 51b receives and holds a zero speed signal $S_{VO}$ from a zero speed detector 64 in the drive unit 6 indicating that a speed of the voice coil motor 3a is zero; and the HOLE latch 51c receives and holds the hole signal $S_{HOL}$ from the comparator 13. The main control unit 5 further includes a microprocessor unit (MPU) 52 described below in detail, an address decoder 53 and a read-only-memory (ROM) 54. The address decoder 53 decodes an address on an address bus A-BUS and from the MPU 52, and generates enable signals for the input register 51 and other registers in the main control unit 5, a digital-to-analog converter (DAC) 58a, and an analog-to-digital converter (ADC) 58b, and load signals for the step pulse counter 50, a difference counter 57, and timers 55a and 55b. The ROM 54 stores programs executed at the MPU 52. The ROM 54 also stores a variety of parameters, such as physical track addresses of the servo tracks. The main control unit 5 includes the timers 55a and 55b. The first timer 55a is preset to a predetermined time value from the MPU 52 through a data bus D-BUS and counts down the predetermined time value at every clock signal. When the preset time value reaches zero, the timer 55a generates an interruption signal $S_{INT}$ to an interruption input terminal INT of the MPU 52, requesting an interruption processing from the MPU 52.

The main control unit 5 includes a random access memory (RAM) 56. The RAM 56 contains a target cylinder register for a physical track address (TCRP) 56a, a target cylinder register for a logical track address (TCRL) 56b, a present (current) cylinder register for a physical track address (PCRP) 56c, and a present cylinder register for a logical track address (PCRL) 56d. The RAM 56 also contains an offset correction register 56e storing offset correction values $C_I$ to $C_n$ for track zones. As shown in FIG. 3, in this embodiment the number of zones is four: n=4. The RAM 56 further contains a correction confirmation flag table 56f storing flags for confirming the validity of the offset correction values $C_I$ to $C_n$.

The main control unit 5 includes the difference counter 57, the DAC 58a, the ADC 58b, and an output register 59. The difference counter 57 loads a moving track number which is the difference between a target physical track address and a current (present) physical track address, and subtracts track cross pulses, indicating a motion of the magnetic head unit 2 by the voice coil motor 3a, from a track cross pulse generator 63. The DAC 58a receives the offset correction value from the MPU 52 and converts that value to an analog value. The ADC 58b converts an analog peak hold signal of a servo track read signal from a peak holder 70 to a digital value and supplies the signal to the MPU 52. The output register 59 includes a direction (DIR) latch 59a, a seek (SEEK) latch 59b, a read inhibit (RD) latch 59c, a track zero (TRO) latch 59d, and a seek completion (SC) latch 59e. The DIR latch 59a holds the direction of a motion of the magnetic head unit 2 in a radial direction of the magnetic disc 1; the SEEK latch 59b holds the status where the seek operation is executed; the RD latch 59c is set when the output from the read unit 7 of the read data sensed at the magnetic head 2e is inhibited and prohibits the output from the read unit 7; the TRO latch 59d is set to indicate a condition where the magnetic head 2e lies at a track address "0" to the host computer; and the SC latch 59e indicates a condition where the seek operation is completed.

The A-BUS transmits the address from the MPU 52 to the address decoder 53 and the ROM 54. The D-BUS transmits data thereon between the circuit elements in the main control unit 5.

The drive unit 6 comprises a reference speed generator 60, a speed error detector 61, and a speed signal generator 62. The speed signal generator 62 receives and differentiates the position signal $S_{POS}$ from the encoder 3b, generating an actual speed Va of the voice coil motor 3a. The reference speed generator 60 generates a speed reference Vr on the basis of the output from the difference counter 57 and having a polarity defined by the direction of the DIR latch 59a. The speed error detector 61 receives the reference speed Vr and the actual speed Va and outputs a speed error $\Delta V : Vr - Va$. The drive unit 6 comprises the track cross pulse generator 63, a speed zero (VO) detector 64, an adder 65, a multiplexer 66, and a voice coil motor (VCM) driver 67. The track pulse generator 63 receives the position signal $S_{POS}$ from the encoder 3b and generates the track cross pulses. The track cross pulses are generated at every predetermined position change of the position signal $S_{POS}$, indicating the crossing of each track by the magnetic head 2e. The track cross pulses are supplied to the difference counter 57 which counts down the track number supplied thereto. The speed zero (VO) detector 64 detects the time when the actual speed Va from the speed signal generator 62 becomes approximately zero, and outputs the speed zero signal $S_{VO}$ to the VO latch 51b in the input register 51. The adder 65 adds the offset correction value from the DAC 58a and the position signal $S_{POS}$ from the encoder 3b, and outputs an offset corrected position control signal $S_{PC}$. The multiplexer 66 receives the speed error $\Delta V$ and the offset corrected position control signal $S_{PC}$, and outputs one of those values in response to the output from the SEEK latch 59b in the output register 59. More specifically, when the SEEK latch 59b is set the multiplexer 66 outputs the speed error $\Delta V$, in other cases it outputs the position control signal $S_{PC}$. The VCM driver 67 includes a drive transistor and drives the voice coil motor 3a in response to the output from the multiplexer 66.

The read unit 7 comprises the peak holder 70, a data pulse generator 71, a pseudo-data generator 72, and a multiplexer 73. The peak holder 70 holds a peak of the read output from the magnetic head 2e and outputs that value to the ADC 58b. This value may be used for detecting the offset. The date pulse generator 71 receives the read output from the magnetic head 2e and generates data pulses. The pseudo-data generator 72 generates a pseudo-data described later in detail. The multiplexer 73 receives the data pulses from the data pulse generator 71 and the pseudo-data from the pseudo-data generator 72 and outputs one thereof in response to the content set in the RD latch 59c in the output register 59. Specifically, when the RD latch 59 is set, the pseudo-data is output to the host computer, in other cases the data pulses are output.

To summarize the operation of the main control unit 5, the drive unit 6, and the read unit 7, the main control unit 5 executes an initial operation described later with reference to FIGS. 6a and 6b when the power is turned ON, calculating the offset correction values for the track zones of the magnetic disc. Subsequently, the main control unit 5 permits the reception of a command. The main control unit 5 receives a seek command consisting of the step pulse and the direction, from the host computer, and executes the access operation described later. The main control unit 5 then outputs a track zero signal $S_{TRO}$ from the TRO latch 59d and a seek completion signal $S_{SC}$ from the seek completion latch 59e to the host computer. Also, the main control unit 5 gives the amount of movement of the magnetic head 2e obtained from the difference counter 57, and the offset correction value from the DAC 58a, to the drive unit 6. The main control unit 5 receives the VO signal $S_{VO}$ from the drive unit 6 and the peak hold signal from the read unit 7.

The encoder 3b, the track cross pulse generator 63, and the difference counter 57 form a position control loop (system). Also, the encoder 3b, the speed signal generator 62 and the speed error detector 61 form a speed control loop (system). These control loops perform the position control of the voice coil motor 3a to a target track. After the speed of the voice coil motor 3a becomes approximately zero, these control loops perform a position correction control containing the offset correction by using the position signal $S_{POS}$ from the adder 65.

The read unit 7 gives the peak hold signal for using the offset calculation to the main control unit 5. The read unit 7 also gives one of the data pulses and the pseudo-data as the read data to the host computer.

Figure 6A:
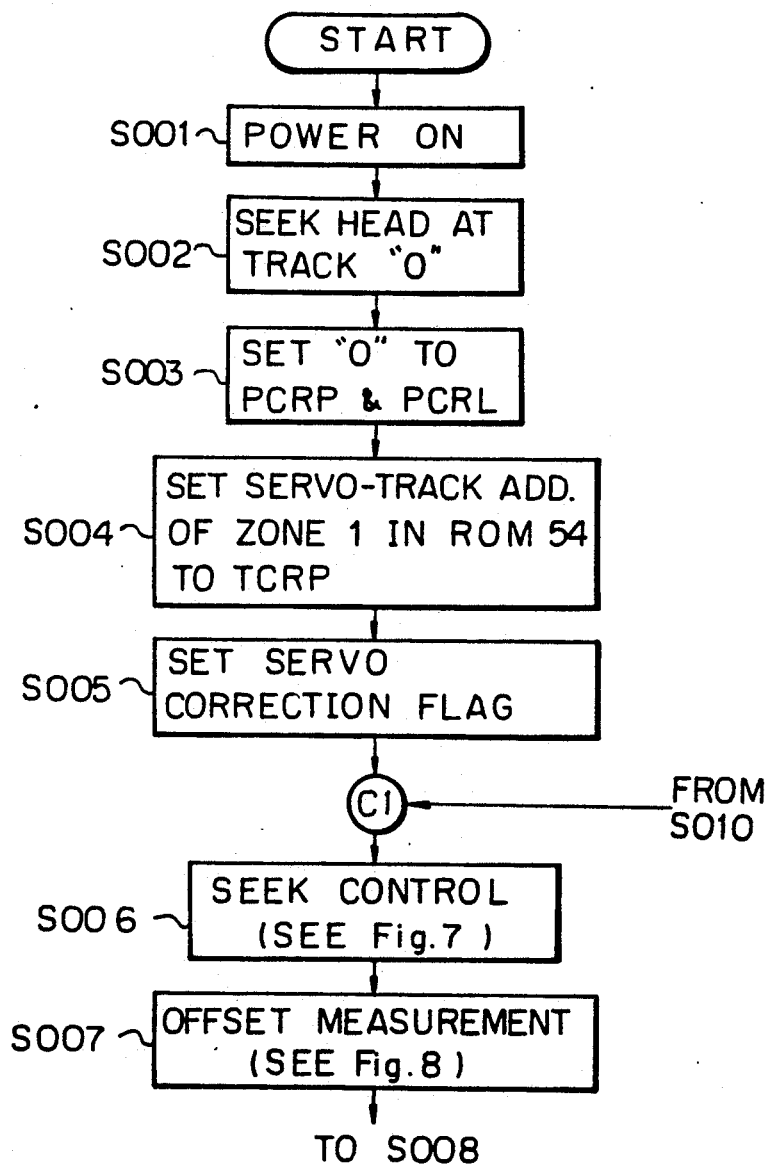
FIGS. 6a and 6b are flow charts of an initial operation of the magnetic disc system in FIG. 5.
Figure 6B:
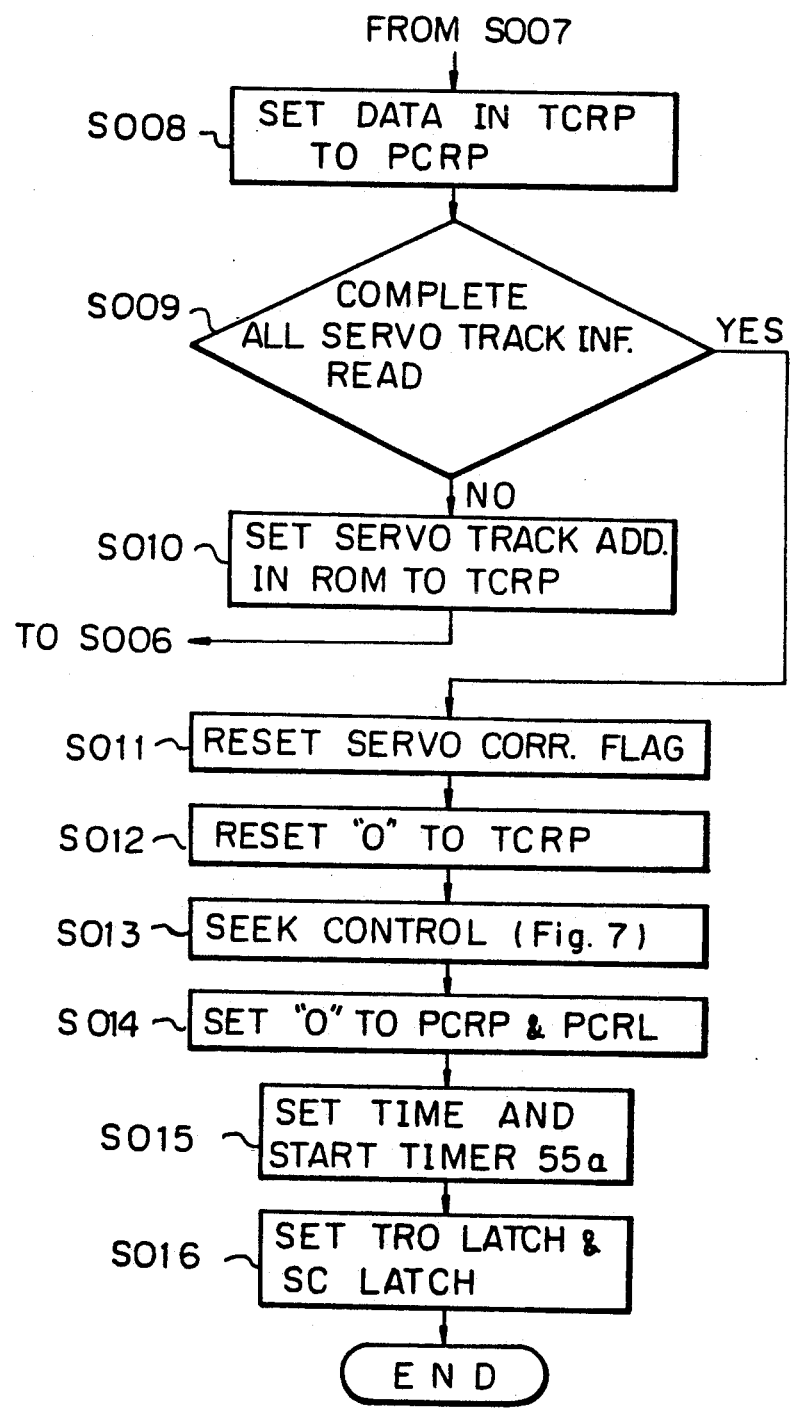

Referring to FIGS. 6a and 6b, the initial operation (processing) will be described.

Steps 001 to 003 (S001 to S003)

When a power is supplied to the MPS (S001), the MPU 52 performs the seek-control for the magnetic head unit 2 at a track "0" (S002). An outer-guard-hand is provided at an outer circumference of the track "0" of the magnetic disc, and the magnetic head 2e is moved to the outer-guard-band by the voice coil motor 3a in response to the output from the difference counter 57. When the magnetic head 2f reaches the outer-guard-band, the magnetic head unit 2 is stopped. Thereafter, the magnetic head 2e is moved inward of the magnetic disc in a radial direction and is positioned at the track "0" by the voice coil motor 3a. Subsequently, the MPU 52 sets zero to the PCRP 56c and the PCRL 56d as a current address, i.e., the track "0".

Steps 004, 005 (S004, S005)

The MPU 52 reads a servo track address in the zone 1, i.e., the physical address "50", from the ROM 54 and sets the physical address "50" to the TCRP 56a as the target track address (S004). The MPU 52 also sets a servo-correction flag to the correction confirmation flag table 56f (S005).

Steps 006 (S006)

The MPU 52 executes the seek control to position the magnetic head 2e at the target track, i.e., the servo track. The seek control can be carried out by the sequences (steps 021 to 031) shown in FIG. 7 and explained below.

Steps 021 and 022 (S021, S022)

The MPU 52 calculates the difference between the target physical address stored in the TCRP 56a and the present (current) physical address stored in the PCRP 56C and sets the calculated difference to the difference counter 57 as the moving distance. The MPU 52 sets the direction of which value is "1" when the target physical address is greater than the current physical address, or in other cases sets the value zero, to the DIR latch 59a (S021). The MPU 52 sets "1" to the SEEK latch 59b (S022). As a result, the multiplexer 66 is made to select the speed error $\Delta V$ from the speed error detector 61. The reference speed generator 60 generates the reference speed Vr in response to the output of the difference counter 57. The reference speed Vr has a polarity determined by the content of the DIR latch 59a. The speed error detector 61 calculates the speed error $\Delta V = Vr - Va$, and the voice coil motor driver 67 receives the speed error $\Delta V$ through the multiplexer 66 and drives the voice coil motor 3a. The encoder 3b outputs the position signal $S_{POS}$ in response to a motion of the voice coil motor 3a, and the track cross pulse generator 63 outputs track cross pulses, subtracting the count in the difference counter 57. In this way, the position control and the speed control are carried out, and the magnetic head 2e is moved to the target physical track address by the voice coil motor 3a.

Steps 023 and 024 (S023 and S024)

The MPU 52 reads and checks the count in the difference counter 57 (S023, S024). When the count is zero, it is deemed that the magnetic head 2e has reached the target physical track address.

Steps 025 and 026 (S025 and S026)

The MPU 52 reads the content in the VO latch 51b (S025). The VO detector 64 generates the zero speed signal when the actual speed Va falls to approximately zero, and the zero speed signal is latched in the VO latch 51b at a logical "one". Accordingly, the MPU 52 checks the VO latched content (S026), and determines whether or not the speed of the voice coil motor 3a is zero when the VO latched content is one.

Subsequently, the MPU 52 starts the position control.

Step 027 (S027)

The MPU 52 clears the SEEK latch 59b in the output register 59. As a result, the multiplexer 66 is made to output the position signal $S_{PC}$ from the adder 65.

Steps 028 to 030 (S028 to S030)

The MPU 52 checks a corresponding servo correction flag in the correction confirmation flag table 56f (S028). When the corresponding flag indicates an offset measurement, the MPU 52 to the DAC 58a (S029). Otherwise, the MPU 52 reads the offset correction value of the zone of the target physical track address in the TCRP 56a from the offset correction register 56e and sets that value to the DAC 58a (S030), thus carrying out the normal access operation with the offset correction. As a result, the adder 65 adds the offset correction value from the DAC 58a and the position signal $S_{POS}$ from the encoder 3b. The offset-corrected position signal $S_{PC}$ is supplied to the voice coil motor driver 67 through the multiplexer 66. The voice coil motor 3a can be fine-controlled.

Step 031 (S031)

The MPU 52 waits for a predetermined time, and then completes the seek control.

The control is restored to step 007 (S007) in FIG. 6a. At step 007, the MPU 52 effects the offset measurement. The offset measurement can be carried out by the sequence shown in FIG. 8, as explained below.

Steps 041 and 042 (S041 and S042)

The MPU 52 resets the HOLE latch 51a in the input register 51 (S041). As set forth above, the hole signal is generated at the comparator 13 in response to the rotation of the spindle motor 11 at every position corresponding to the servo information storing portion on the magnetic disc 1c. The MPU 52 then checks the HOLE latch after a reset (S042).

Steps 043 to 045 (S043 to S045)

When the HOLE latch 51c is set, the magnetic head 2e has read the position information on the servo track. The MPU 52 reads the peak hold zero signals $SVINF_A$ and $SVINF_B$ at the areas A and B through the ADC 58b (S043 and S044), and then calculates the offset:

$$OFFSET = SVINF_A - SVINF_B$$

The MPU 52 also determines a direction of the offset:

DIRECTION = 1 when OFFSET is positive,

DIRECTION = 0 when OFFSET is negative.

Steps 046 and 047 (S046 and S047)

The MPU 52 stores the OFFSET to a corresponding area in the offset correction register 56e, and sets a flag to a corresponding area in the correction confirmation flag table 56f. Thereafter, the MPU 52 transfers the control to step 008 (S008) in FIG. 6b.

Step 008 (S008)

The MPU 52 sets the target physical track address in the TCRP 56a to the PCRP 56c as the present physical track address.

By the above operation, the servo track information read for a single servo track is obtained.

Step 009 (S009)

The MPU 52 checks whether or not the servo track information read for all servo tracks is completed (S009).

Step 010 (S010)

If not, the MPU 52 reads a next servo track address from the ROM 54 and sets the address to the TCRP 56a. The control is then transferred to step 006 and a next servo track information read is carried out.

Steps 011 to 013 (S011 to S013)

When the servo track information read for all servo tracks is completed, the MPU 52 resets the corresponding servo correction flag in the correction confirmation flag table 56f (S011), and sets zero as the physical track address to the TCRP 56a (S012). The MPU 52 carries out the seek control as shown in FIG. 7 in the same manner set forth above (S013), and as a result, the magnetic head 2f can be positioned at the track "0".

Steps 014 to 016 (S014 to S016)

The MPU 52 sets zero as the present track address to the PCRP 56c and PCRL 56d (S014), and then sets a time for updating the offset correction to the timer 55a, and starts the timer 55a (S015). The MPU 52 sets a logical "1" to the TRO latch 59d and the SC latch 59e in the output register 59. The track zero signal $S_{TRO}$ in the TRO latch 59d and the seek complete signal $S_{SC}$ in the SC latch 59e are transmitted to the host computer.

Therefore, the initial operation is completed, and a command from the host computer is acceptable.

The access processing will be described with reference to FIGS. 9a and 9b.

Steps 051 to 056 (S051 to S056)

The MPU 52 reads the count in the step pulse counter 50 (S051), and checks whether or not the count is zero (S052). The host computer gives the step pulses corresponding to a relative logical track address as a seek command, and a count of zero in the step pulse counter 50 indicates that the seek command has not reached the main control unit 5. When the step pulse count is zero, the MPU 52 waits. Otherwise, the MPU 52 transfers the count in the step pulse counter 50 to the TCRL 56b for storing the target logical track address (S053). The MPU 52 waits for a predetermined time (S054), and then again reads the count in the step pulse counter 50 (S055) and compares this count with the target logical track address in the TCRL 56b (S56). If the count does not coincide with the target logical track address, the transfer of the seek command from the host computer continues. The MPU 52 then repeats the operations of steps 053 to 056.

Steps 057 and 058 (S057 and S058)

If the steps pulse count coincides with the target logical track, the seek command transfer is completed, and the MPU 52 reads the direction from the host computer and stored in the ID latch 51a (S057). The MPU 52 then calculates a target logical track address on the basis of the logical relative track address in the TCRL 56b and the present logical track address in the PCRL 56d, and sets that address to the TCRL 56b (S058).

Step 059 (S059)

Figure 10:
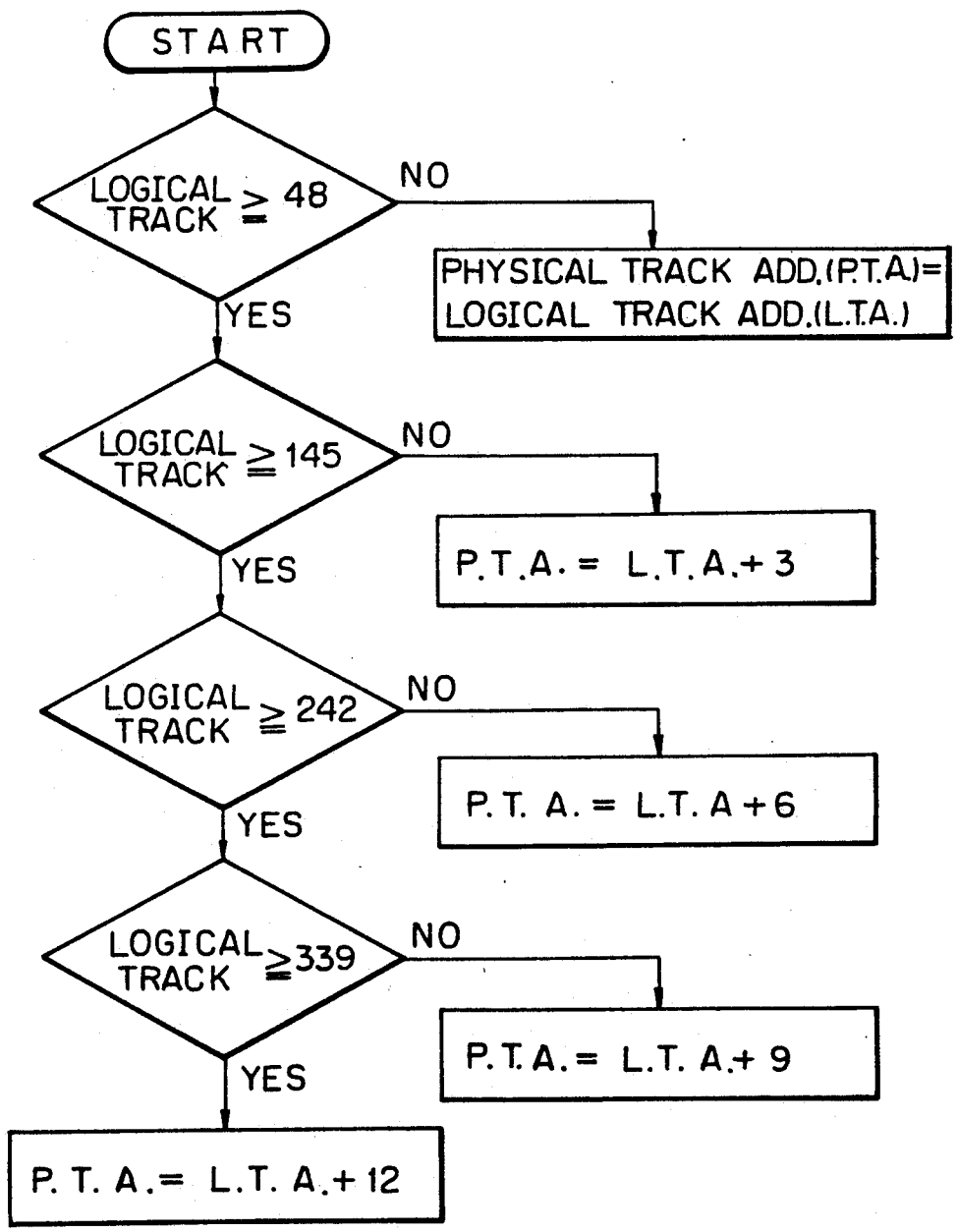
FIG. 10 is a flow chart of a track address translation form a logical track address to a physical track address of the magnetic disc system in FIG. 5.

The MPU 52 translates the calculated target logical track address to a target physical track address, by a translation method as shown in FIG. 10.

The translation in FIG. 10 is based on the relationship of the physical track address including the servo track addresses and the logical track address, as shown in FIG. 3.

The MPU 52 saves the translated target physical track address to the TCRP 56a.

Steps 060 and 061 (S060 and S061)

The MPU 52 finds a track zone corresponding to the target physical track address in the TCRP 56a, and confirms a flag in the correction confirmation flag table 56f corresponding to the found track zone (S060).

After a lapse of the time set in the timer 55a, the flags are reset to update the offset correction values. During the update of the offset correction values, the flags are reset, and accordingly, the offset correction values are invalid. The above confirmation can be carried out to check the validity of the offset correction values.

When a corresponding flag is set, the MPU 52 continues to step 063, or in other cases, to step 062.

Step 062 (S062)

Figure 11:
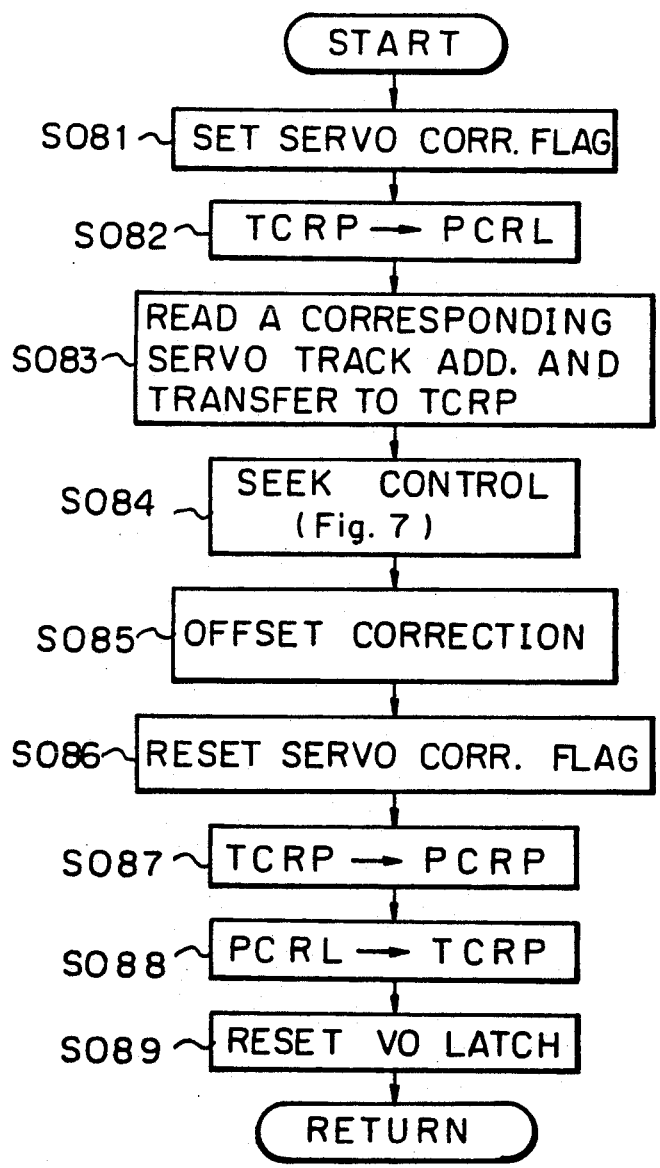
FIG. 11 is a flow chart of the offset measurement.

The offset measurement is carried out as shown in FIG. 11.

Steps 081 to 083 (S081 to S083)

First, the MPU 52 sets the corresponding servo correction flag to the correction confirmation flag table 56f (S081). Second, the MPU 52 transfers the target physical track address from the TCRP 56a to the PCRL 56d (S082). Then, the MPU 52 reads a servo track address in the track zone of the target physical track address from the ROM 54 and transfer that address to the TCRP 56a (S083).

Step 084 (S084)

The seek control is effected by the sequences as shown in FIG. 7, and as a result, the magnetic head 2f is positioned at the above desired servo track.

Step 085 (S085)

Figure 8:
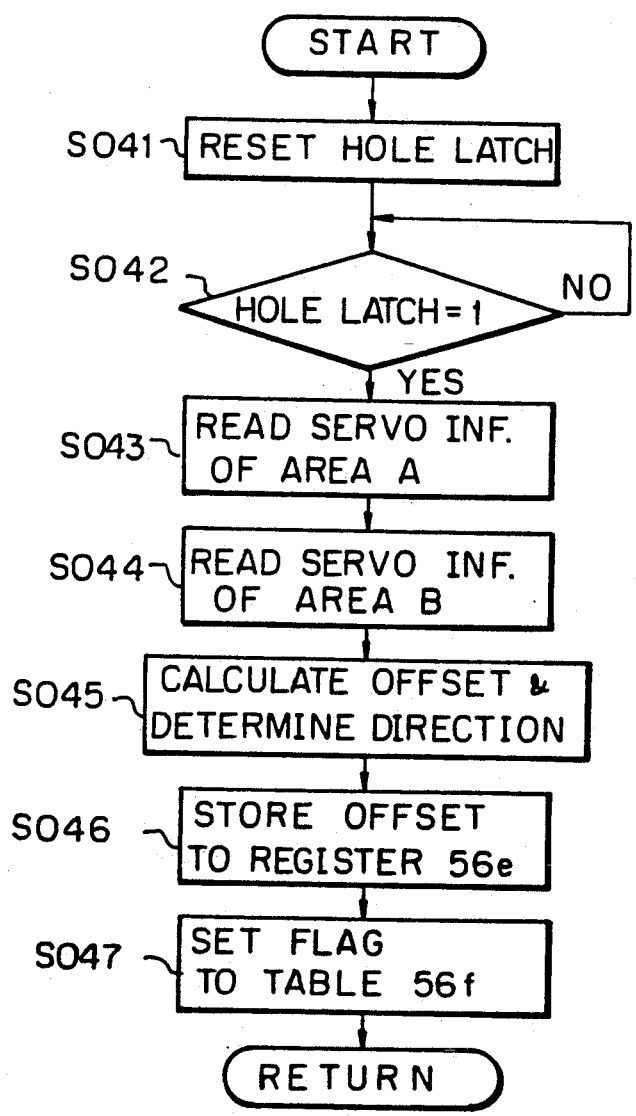
FIG. 8 is a flow chart of the offset measurement of the magnetic disc system in FIG. 5.

The offset correction is carried out by the sequences as shown in FIG. 8, and as a result, the offset correction value of that track zone can be obtained and stored in a corresponding area of the offset correction register 56e. The corresponding flag in the correction confirmation flag table 56f is also set.

Steps 086 to 089 (S086 to S089)

The MPU 52 resets the servo correction flag (S086), and transfers the target servo track address in the TCRP 56a to the PCRP 56c as the present physical track address (S087). The MPU 52 then restores the target physical track address saved in the PCRL 56d to the TCRP 56a (S088), and finally, the MPU 52 resets the VO latch 51b (S089).

Figure 9B:
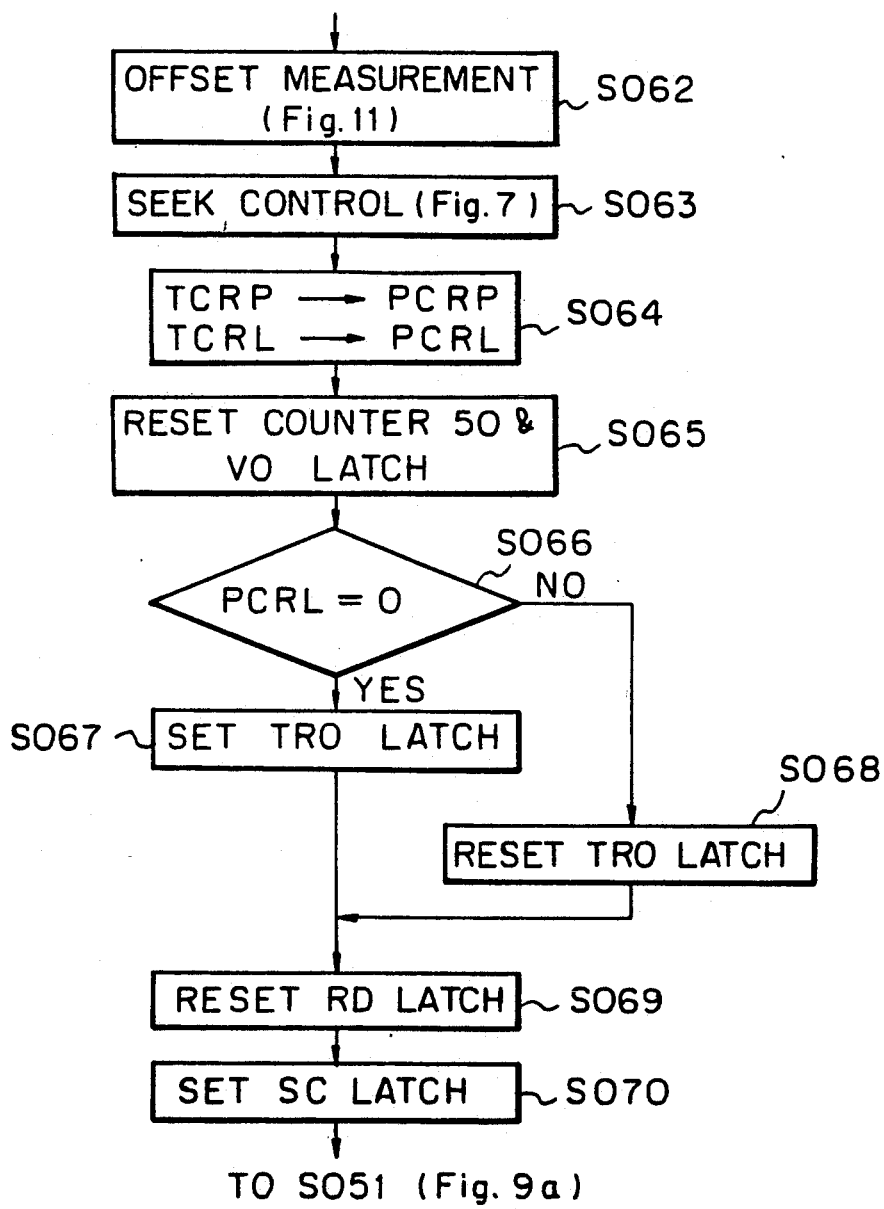

After completion of the offset correction, the MPU 52 executes step 063 (S063) in FIG. 9b.

Step 063 (S063)

The seek control is carried out in accordance with the sequence of FIG. 7. The seek control is achieved on the basis of the target physical track address in the TCRP 56a and the present physical track address in the PCRP 56c and as a result, the magnetic head 2e is positioned at a data track of the target physical track address.

Step 064 (S064)

The MPU 52 transfers the target physical track address in the TCRP 56a to the PCRP 56c as the present physical track address, and transfers the target logical track address in the TCRL 56b to the PCRL 56d as the present logical track address.

Steps 065 to 068 (S065 to S068)

The MPU 52 clears the step pulse counter 50 and the VO latch 51b (S065), and checks the present logical track address in the PCRL 56d (S066). When the present logical track address is zero, in other words, when the magnetic head 2f is positioned at the track "0", the MPU 52 sets the TRO latch 59d (S067), or in other cases, resets the TRO latch 59d (S068).

Steps 069 and 070 (S069 and S070)

The MPU 52 resets the RD latch 59c to change the selection mode at the multiplexer 73 for outputting the data from the data pulse generator 71 (S069), and at the same time, sets the SC latch 59e to output the seek completion signal $S_{SC}$ to the host computer.

The operation is then transferred step 051 and the above access processing is repeated.

The host computer reads the data pulses from the data pulse generator 71 through the multiplexer 73 as read data and confirms the track number contained in the read data from the main control unit 5. If it is a read command, the host computer reads subsequent read data from the data pulse generator 71. On the other hand, if it is a write command, the host computer writes data on the track through a write unit (not shown).

As described above, the host computer gives the logical track address to the main controller 5 and the access with the offset correction for the physical track address for not only the magnetic discs provided with all data tracks but also the magnetic disc 1c provided with servo tracks and data tracks is realized. The offset measurement is carried out at the initial operation, and in addition, is carried out at the reception of the seek command.

Since the offset value may vary during a long operation, offset measurement should be carried out. However, if the offset measurement is carried out at each reception of the seek command, each seek time may become too long. Accordingly, the offset measurement should be carried out at a suitable time. On the other hand, in the above operation, if the offset measurement is carried out for the track zone where the seek command is generated to the track zone, and if the seek command is not generated for the track zones, the offset measurement for the track zones is not carried out. Under this condition, when the write access is carried out to the track zone in response to the seek access generation therefor, non-updated offset values can be used, and as a result, data may be destroyed due to position displacement.

In order to eliminate the above disadvantages, the compulsorily interruption processing for achieving the offset measurement must be carried out in good time. In addition, the offset measurement can be carried out while keeping a fundamental relationship between the host computer and the magnetic disc system.

The MPU 52 starts the timer 55a with a predetermined time, and the timer 55a counts down the time by a timing pulse. When the time becomes zero, the timer 55a generates the interruption signal $S_{INT}$ and starts the offset measurement in the MPU 52. This operation will be described in more detail with reference to FIG. 12.

Steps 091, 092, 093 and 096 (S091, S092, S093 and S096)

Upon receipt of the interruption signal $S_{INT}$, the MPU 52 checks all flags in the correction confirmation flag table 56f (S091). If all flags are not zero, the MPU 52 clears the flags to zero, compulsorily setting the flags in an invalid condition (S092), loads the time to and starts the timer 55a (S096).

Steps 092, 094, 095 and 096 (S092, S094, S095 and S096)

When all flags are zero, it is deemed that no seek command has been received for a period of the elapse of the time in the timer 55a, and thus an offset update is not carried out for that period. The MPU 52 sets the RD latch 59c to inhibit the output of the data from the data pulse generator 71 through the multiplexer 72; in other words, to output the pseudo-data from the pseudo-data generator 72 (S094). The MPU 52 resets the TRO latch 59d to output the track "0" signal STRO of logical "0" to the host computer (S095), and the MPU 52 then execute the processing of step 096.

If the host computer receives the pseudo-data and the logical track "0" signal, the host computer may consider that the seek operation is incomplete and then retry the seek command transmission. Accordingly, by this virtual malfunction, the fundamental relationship between the host computer and the magnetic disc system is maintained. In other words, the host computer does not require an additional processing, and a data neglect for writing or reading is avoided.

The above pseudo-data output can be replaced to cut data output instead of the pseudo-data output, for example, all one or all zero. This can be easily achieved by removing the pseudo-data generator 72.

The above operation is briefly shown in FIGS. 13a to 13e.

The above operation is described in more detail with reference to FIGS. 14a to 14f and FIGS. 15a to 15h.

Figure 14:
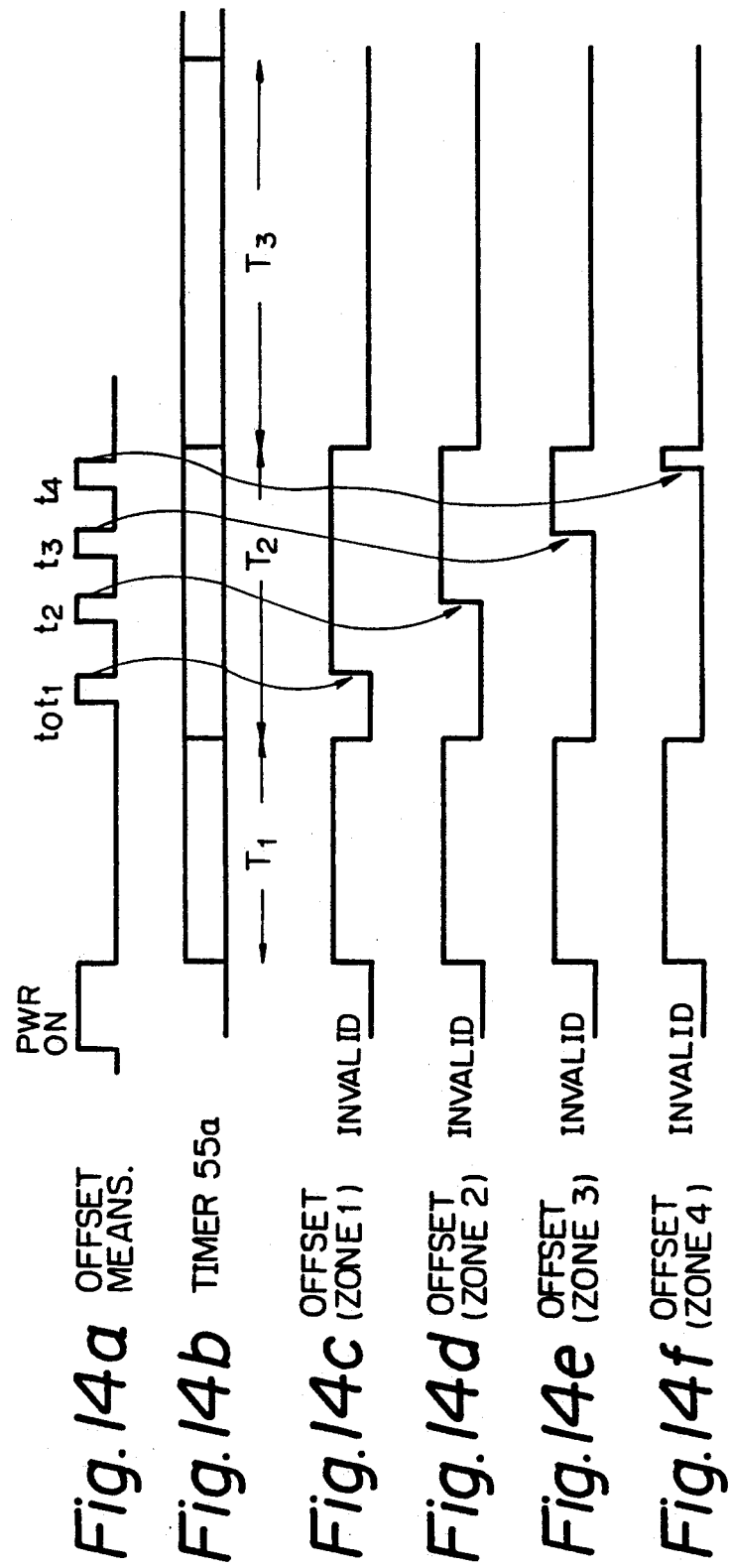

In FIG. 14a, at a power ON (PWR ON), the offset measurement of the initial operation is carried out, and the measured offset values for all track zones are stored in the offset correction register 56e. All flags in the correction confirmation flag table 56f are also set, and thereafter, the timer 55a is initiated with the time $T_1$. Before a lapse of the first time $T_1$, all offset values for the track zones 1 to 4, obtained at the initial offset measurement, are valid (FIGS. 14c to 14f). During the first time $T_1$, the access is executed with the offset value for a seek command to each track zone.

When the first time $T_1$ has elapsed at a time $t_0$, the interruption signal $S_{INT}$ is generated, and all offset values for all track zones are made invalid. The timer 55a is again set to the time $T_1$. During this time, when the seek command is generated at a time $t_1$, the offset measurement for the track zone relevant to the seek command, in the example, the track zone 1, is carried out. Thereafter, the updata of the measured offset value to a corresponding area in the offset correction register 56e, and the setting of a corresponding flag in the correction confirmation flag table 56f are carried out. Subsequently, the access is carried out by using an updated offset value. Note that the offset measurement for other track zones is not performed so that an access time for the seek command transmission is maintained as a short time. During the second time $T_2$, if another seek command transmission for another track zone exists, the offset measurement for another track zone can be carried out.

Figure 15:
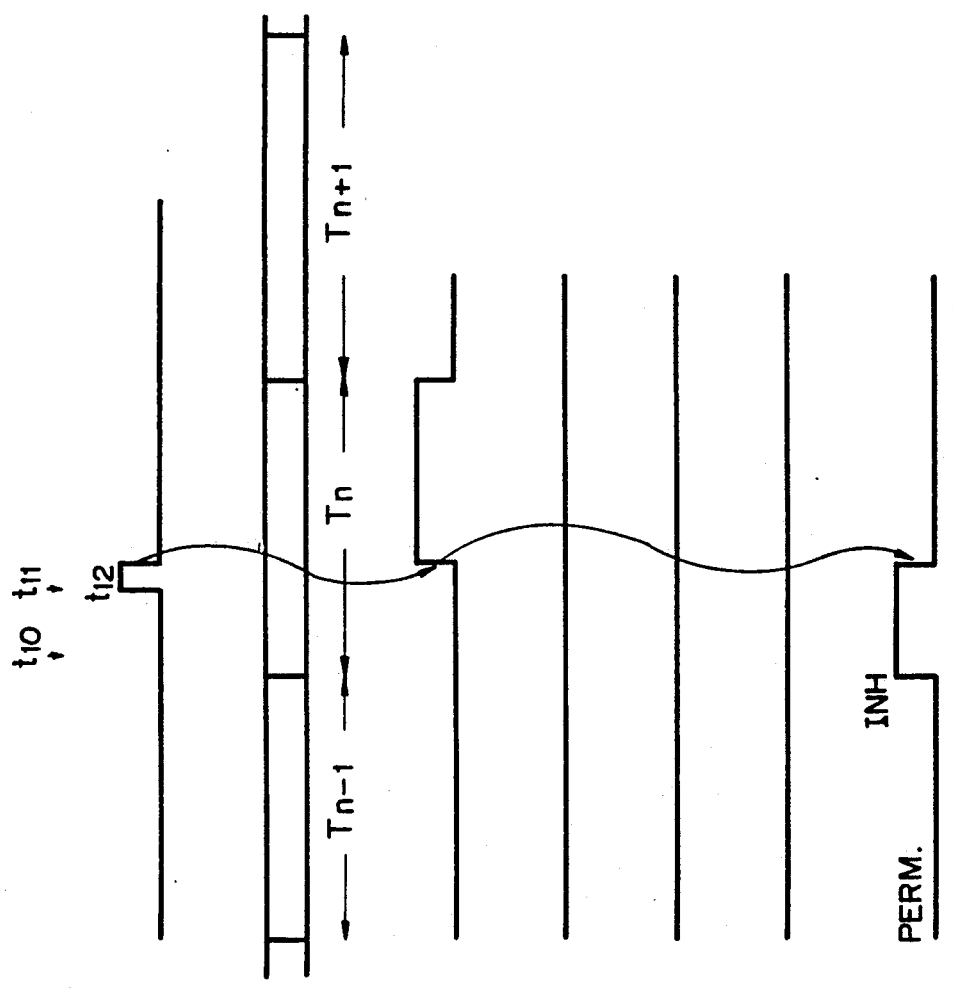

Conversely, as shown in FIG. 15b, if the seek command is not generated in a previous time $T_{n-1}$, the offset measurement is not carried out for the time $T_{n-1}$. If the seek command is generated for a next time $T_n$, the offset measurement is effected. However, if a read or write command without a seek command is generated, in other work, a read or write command to a same track address is generated, the access of the magnetic head is not effected and only the read or write operation is effected. In this case, the offset measurement is not carried out. However, a new displacement of the track address may be generated. Under this condition, a correct read or write operation is not guaranteed.

Figure 12:
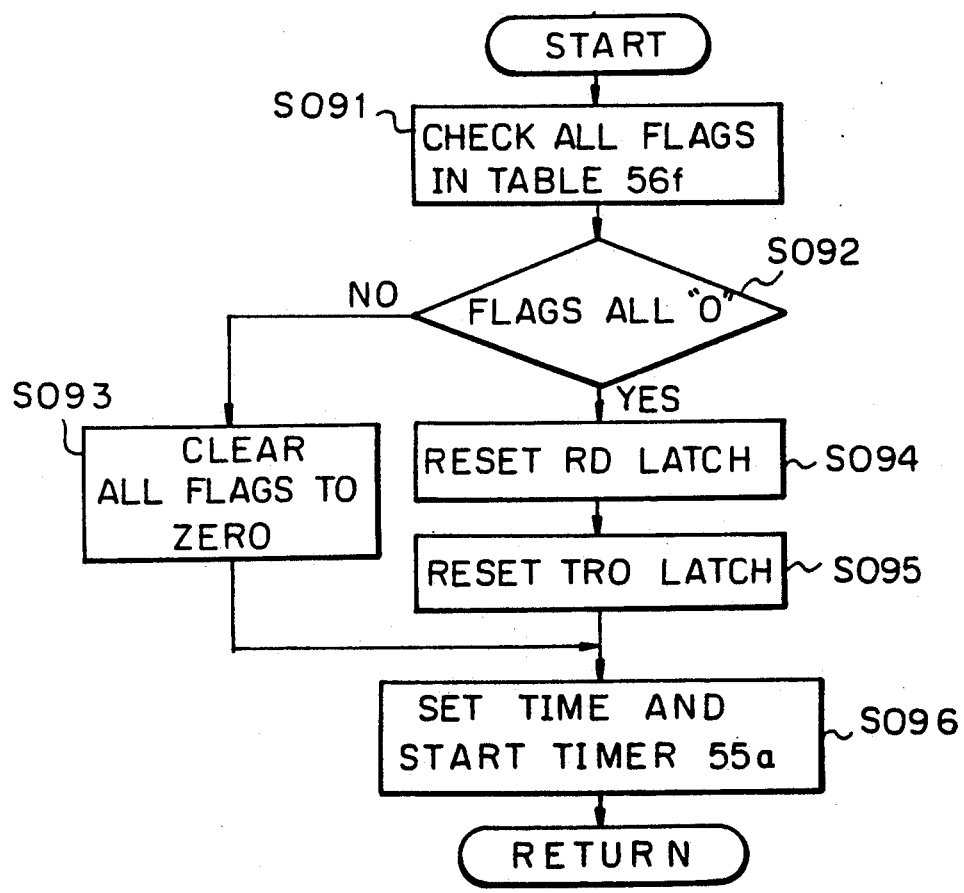
FIG. 12 is a flow chart explaining an interruption for energizing the offset update operation.
Figure 13:
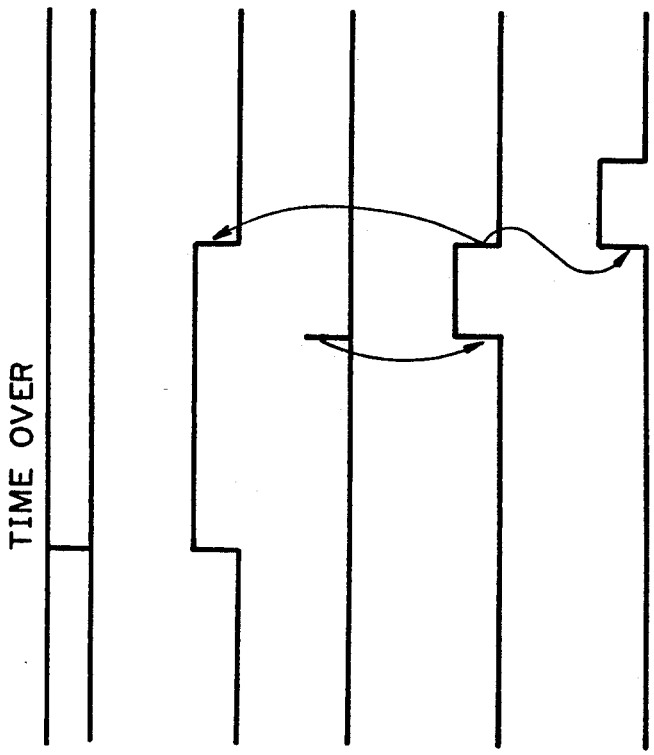
FIGS. 13a to 13e, 14a to 14f and 15a to 15h are timing chart illustrating the interruption and the offset measurement operation.

In order to eliminate this defect, when the seek command is not generated for the time $T_{n-1}$ and all flags in the correction confirmation flag table 56f are zero, as shown in FIG. 12, the RD latch 59c is set at step 094. The host computer then reads the pseudo-data but cannot discriminate the track number, and consequently, the host computer decides that an error has occurred. The retry operation is the seek operation for the track "0", and as a result, the seek operation of step 002 in FIG. 6a is carried out. When the seek operation at the track "0" is completed, the host computer sends a seek command to the above read or write track, the offset update of the track zone is carried out, and the access is performed by using the updated offset value. The RD latch 59c is reset to output the data from the data pulse generator 71.

Figure 16:
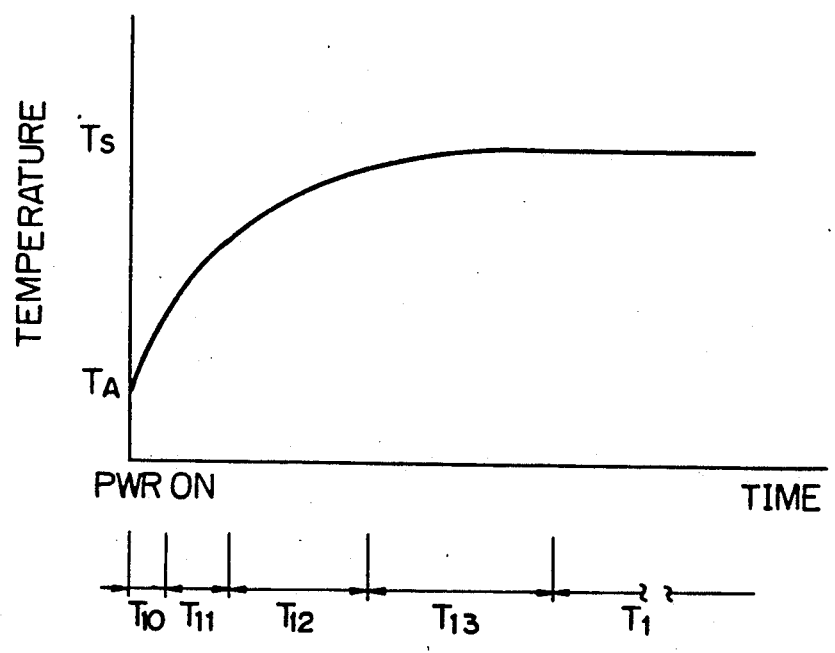
FIG. 16 is a graph illustrating the temperature change of the magnetic disc with time.

Normally, the magnetic discs and the mechanism therefor are in a cold state where the temperature is low, for example, an ambient temperature $T_A$, in an initial condition at the power ON. The temperature may be greatly increased with time, as shown in FIG. 16, and the temperature may saturate at a constant temperature $T_S$. During the time of the temperature change, the offset may be greatly changed, and accordingly, a more precise offset update is needed during this interval.

The second timer 55b in the main control unit 5 in FIG. 5 is provided to generate the interruption signal $S_{INT}$ to the MPU 52 during the above time, and the times $T_{10}$, $T_{11}$, $T_{12}$ and $T_{13}$, as shown in FIG. 16, are determined on the basis of the temperature change. One of these times is set to the timer 55b by the MPU 52 with a time laps, and the above offset update is carried out in response to each time lapse. The operation of the timer 55b is similar to that of the timer 55a, and thus a description thereof is omitted.

After a predetermined time lapse, the timer 55a may be used instead of the timer 55b, and the above interruption operation may be carried out.

The above interruption using the timer 55b for the temperature change time, can be easily replaced on the basis of a constant temperature change. When the temperature change becomes approximately zero, the transient interruption operation may be terminated.

In the above embodiment, the logical track address from the host computer is the step pulse as a relative quantity and the step pulse counter 50 is used. The logical track address can be replaced by absolute type data, for example, serial data in digital form.

Many widely different embodiments of the present invention may be constructed without departing from the spirit and scope of the present invention. It should be understood that the present invention is not limited to the specific embodiments described in this specification, except as defined in the appended claims.

We claim:

1. A track access control system for a magnetic disc system connected to a host computer issuing a seek command having a target logical track address, said track access control system comprising:

a magnetic disc unit including at least one magnetic disc, at least one face of which includes a plurality of track zones in a radial direction thereof, each track zone including a plurality of data tracks and at least three continuous servo tracks, said servo tracks located at a middle position of each said track zone, each servo track having a plurality of servo information storing portions along the circumference of a circle;

at least one magnetic head accessing said tracks on said face of said magnetic disc;

magnetic head moving means, connected to said magnetic head, for moving said magnetic head in the radial direction;

rotation means, connected to said magnetic disc unit, for rotating said magnetic disc unit;

timing signal generation means, connected to said rotation means, for generating a timing signal corresponding to a rotation of said servo information storing portions;

servo data generation means, connected to said magnetic head, for reading servo information from said servo information storing portions through said magnetic head, and for generating servo data in response to said timing signal of said timing signal generation means;

track offset update means, connected to said servo data generation means, for measuring and updating a track offset of each said track zone by said servo data from said servo tracks of each track zone at an initial condition, and for updating said track offset from said servo data for said plurality of servo tracks located in the track zone, including a track target which is ordered from the host computer, after reception of a seek command from the host computer;

track address translation means for receiving the target logical track address, from said host computer, which is a track address sequentially given to only said plurality of data tracks in a radial direction, and for translation said target logical track address into a target physical track address, which is another track address sequentially given to said plurality of data tracks and said plurality of servo tracks in a radial direction, based upon track structure of a magnetic disc to be accessed, wherein when said servo tracks are located between a track of a current logical track address and a track of a target logical track address, a number of the servo tracks located therebetween are added t said target logical track address in order to translate said logical track address into said physical track address; and control means, connected to said track offset update means and said track address translation means, for controlling said magnetic head through said magnetic head moving means so that said magnetic head is moved to said plurality of servo tracks located in the track zone, including said target track commanded by the host computer based upon the translated physical track address for updating said track offset, after reception of a seek command from the host computer, and said magnetic head is moved to said target track commanded by the host computer based upon the translated physical track address by using said measured track offset corresponding to said track zone including the translated target physical track.

2. A track access control system for a magnetic disc system according to claim 1, wherein said track offset update means updates all track offsets for all track zones in an initial condition.

3. A track access control system for a magnetic disc system according to claim 2, wherein said track offset update means, updates a track offset which is not updated within a predetermined period of time.

4. A track access control system for a magnetic disc system according to claim 3, wherein said track offset update means updates a track offset in response to a reception of said seek command for moving said magnetic disc to a different track zone when said different track zone is not offset-updated within the predetermined period of time.

5. A track access control system for a magnetic disc system according to claim 3, wherein said update offset means is compulsorily energized when at least one track zone is not offset-updated within the predetermined period of time.

6. A track access control system for a magnetic disc system according to claim 5, wherein said control means outputs error data for an access command when said track offset update means is compulsorily energized, and said control means outputs normal data when said track offset update means terminates the offset update.

7. A track access control system for magnetic disc system according to claim 5, wherein said control means outputs error data for an access command or stops the output of read data when said track offset update means is compulsorily energized and said control means outputs normal data when said track offset update means terminated the offset update.

8. A track access control system for a magnetic disc system according to claim 3, wherein said track offset update means is compulsorily energized in response to a predetermined temperature change of at least said magnetic disc during a temperature transient state.

9. A track access control system for a magnetic disc system according to claim 8, wherein said track offset update means is compulsorily energized in a subsequent time period defined by a predetermined constant temperature change for the temperature transient state.

10. A track access control system for a magnetic disc system according to claim 9, wherein said control means outputs error data for an access command when said track offset update means is compulsorily energized, and said control means outputs normal data when said track offset update means terminates the offset update.

11. A track access control system for a magnetic disc system, comprising:

a magnetic disc unit including at least one magnetic disc, at least one face of which includes a plurality of servo tracks and a plurality of data tracks in a radial direction thereof, said plurality of data tracks being divided into a plurality of zones, each zone comprising a plurality of data tracks and at least three continuous servo tracks, each servo track having a servo information storing portion along the circumference of a circle;

at least one magnetic head accessing said tracks on said face of said magnetic disc;

magnetic head moving means, connected to said magnetic head, for moving said magnetic head in the radial direction;

rotation means, connected to said magnetic disc unit, for rotating said magnetic disc unit;

servo data generation means, connected to said magnetic head, for reading servo information from said servo information storing portion through said magnetic head, and generating servo data;

track offset update means, connected to said servo data generation means, for measuring and updating a track offset at an initial condition and at a reception of a seek command based on said servo data for said plurality of servo tracks;

timer means for counting a predetermined time based on a temperature change which is started at an update of said track offset;

a holding means for holding said track offset which corresponds to each servo track;

prohibiting means for prohibiting use of said track offset held in said holding means when the seek command is received from a host computer until said timer means counts said predetermined time; and control means, connected to said track offset update means, for controlling a position of said magnetic head through said magnetic head moving means by using said measured track offset, obtained from the servo track to position said magnetic head at a desired track.

12. A track access control system for a magnetic disc system comprising:

a magnetic disc unit including at least one magnetic disc, at least one face of which includes a plurality of track zones in a radial direction thereof, each track zone including a plurality of data tracks and at least three continuous servo tracks, said servo tracks located at a middle portion of each said track zone, each servo track having a plurality of servo information storing portions along the circumference of a circle;

at least one magnetic head accessing said tracks on said face of said magnetic disc;

magnetic head moving means, connected to said magnetic head, for moving said magnetic head in the radial direction;

rotation means, connected to said magnetic disc unit, for rotating said magnetic disc unit;

timing signal generation means, connected to said rotation means, for generating a timing signal corresponding to a rotation of said servo information storing portions;

servo data generation means, connected to said magnetic head, for reading servo information from said servo information storing portions through said magnetic head, and generating servo data in response to said timing signal of said timing signal generation means;

track offset update means, connected to said servo generation means, for measuring and updating a track offset from said servo data for said plurality of servo tracks located in all of said track zones during an initial condition, and for measuring and updating said track offset from servo data for said plurality of servo tracks located in said track zone, including a target track which is ordered from a host computer, during reception of a seek command from the host computer;

track address translation means for receiving a target logical track address from a host computer, said target logical address is a track address sequentially given to only said plurality of data tracks, and for translating said target logical track address into a target physical track address, which is another track address sequentially given to said plurality of data tracks and said plurality of servo tracks in a radial direction, based upon track structure of a magnetic disc to be accessed, wherein when said servo tracks are located between a track of a current logical track address and a track of a target logical track address, a number of the servo tracks located therebetween are added to said target logical track address in order to translate said logical track address into said physical track address; and control means, connected to said track offset update means and said track address translation means, for controlling said magnetic head through said magnetic head moving means so that said magnetic head is moved to said plurality of servo tracks located in the track zone, including said target track commanded by the host computer based upon the translated physical track address for updating said track offset, after reception of a seek command from the host computer, and said magnetic head is moved to said target track commanded by the host computer based upon the translated physical track address by using said measured track offset corresponding to said track zone including the translated target physical track, said control means outputting error data for requesting an access command when said track offset update means is compulsorily energized when at least one track zone is not offset-updated within a predetermined period of time, and said control means outputs normal date when said track offset update means terminates the offset update.

13. A track access control system for a magnetic disc system comprising:

a magnetic disc unit including at least one magnetic disc, at least one face of which includes a plurality of track zones in a radial direction thereof, each said track zone including a plurality of data tracks and at least three continuous servo tracks, said servo tracks located at a middle position of each said track zone, each servo track having a plurality of servo information storing portions along the circumference of a circle;

at least one magnetic head accessing said tracks on said face of said magnetic disc;

magnetic head moving means, connected to said magnetic head, for moving said magnetic head in the radial direction;

rotation means, connected to said magnetic disc unit, for rotating said magnetic disc unit;

timing signal generation means, connected to said rotation means, for generating a timing signal corresponding to a rotation of said servo information storing portions;

servo data generation means, connected to said magnetic head, for reading servo information from said servo information storing portions through said magnetic head, and generating servo data in response to said timing signal of said timing signal generation means;

track offset update means, connected to said servo data generation means, for measuring and updating a track offset of each said track zone by said servo data from said servo tracks of each track zone, said track offset updata means updating a track offset which is not updated until reception of a seek command, said track offset update means being compulsorily energized in response to a predetermined temperature change of at least said magnetic disc during a temperature transient state;

track address translation means for receiving a target logical track address from a host computer, said target logical track address is a track address sequentially given to only said plurality of data tracks in a radial direction, and for translation said target logical track address into a target physical track address, which is another track address sequentially given to said plurality of data tracks and said plurality of servo tracks in a radial direction, based upon track structure of a magnetic disc to be accessed, wherein when said servo tracks are located between a track of a current logical track address and a track of a target logical track address, a number of the servo tracks located therebetween are added to said target logical track address in order to translate said logical track address into said physical track address; and control means, connected to said track offset update means and said track address translation means, for controlling said magnetic head through said magnetic head moving means so that said magnetic head is moved to said plurality of servo tracks located in the track zone, including said target track commanded by the host computer based upon the translated physical track address for updating said track offset, after reception of a seek command from the host computer, and said magnetic head is moved to said target track commanded by the host computer based upon the translated physical track address by using said measured track offset corresponding to said track zone including the translated target physical track.

14. A track access control system for a magnetic disc system according to claim 13, wherein said track offset update means is compulsorily energized in a subsequent time period defined by a predetermined constant temperature change for the temperature transient state.

15. A track access control system for a magnetic disc system according to claim 14, wherein said control means outputs error data for an access command when said track offset update means is compulsorily energized, and said control means outputs normal data when said track offset updata means terminates the offset update.

* * * * *

UNITED STATES PATENT AND TRADEMARK OFFICE
CERTIFICATE OF CORRECTION

PATENT NO. : 5,109,306
DATED     : April 28, 1992
INVENTOR(S) : Hiroyuki MASE et al It is certified that error appears in the above-identified patent and that said Letters Patent is hereby corrected as shown below:

On the cover page, in Item [63], delete "Jan. 30, 1989" and substitute therefor -- Nov. 30, 1989 --.

Signed and Sealed this

Thirty-first Day of August, 1993

*Attest:*

BRUCE LEHMAN

*Attesting Officer*   *Commissioner of Patents and Trademarks*